Feb. 24, 1970     F. DINNENDAHL     3,496,795
PANTOGRAPH
Filed Aug. 8, 1968     2 Sheets-Sheet 2
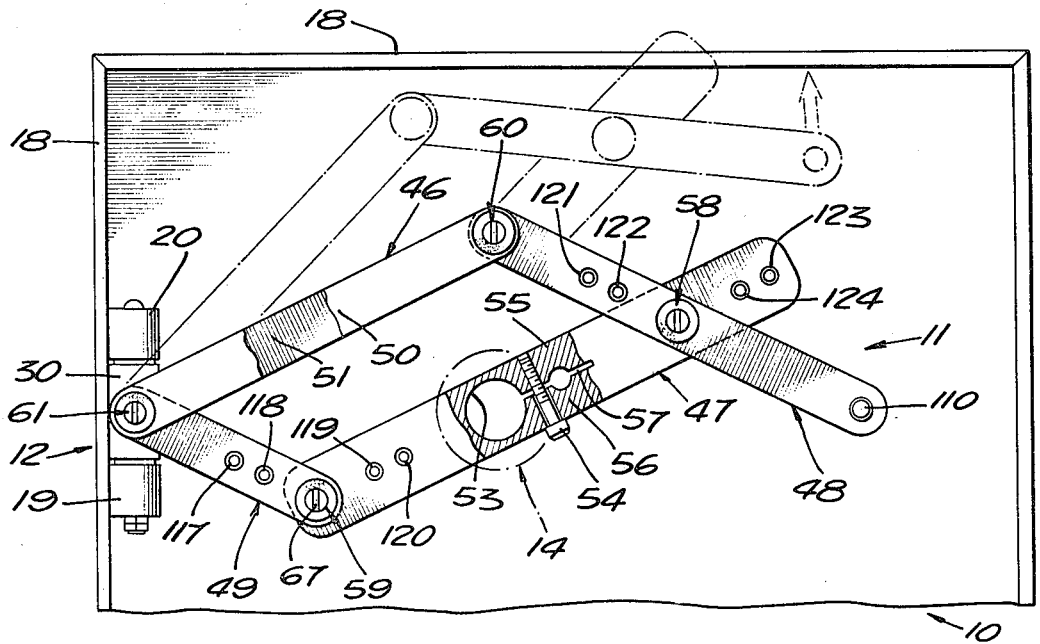
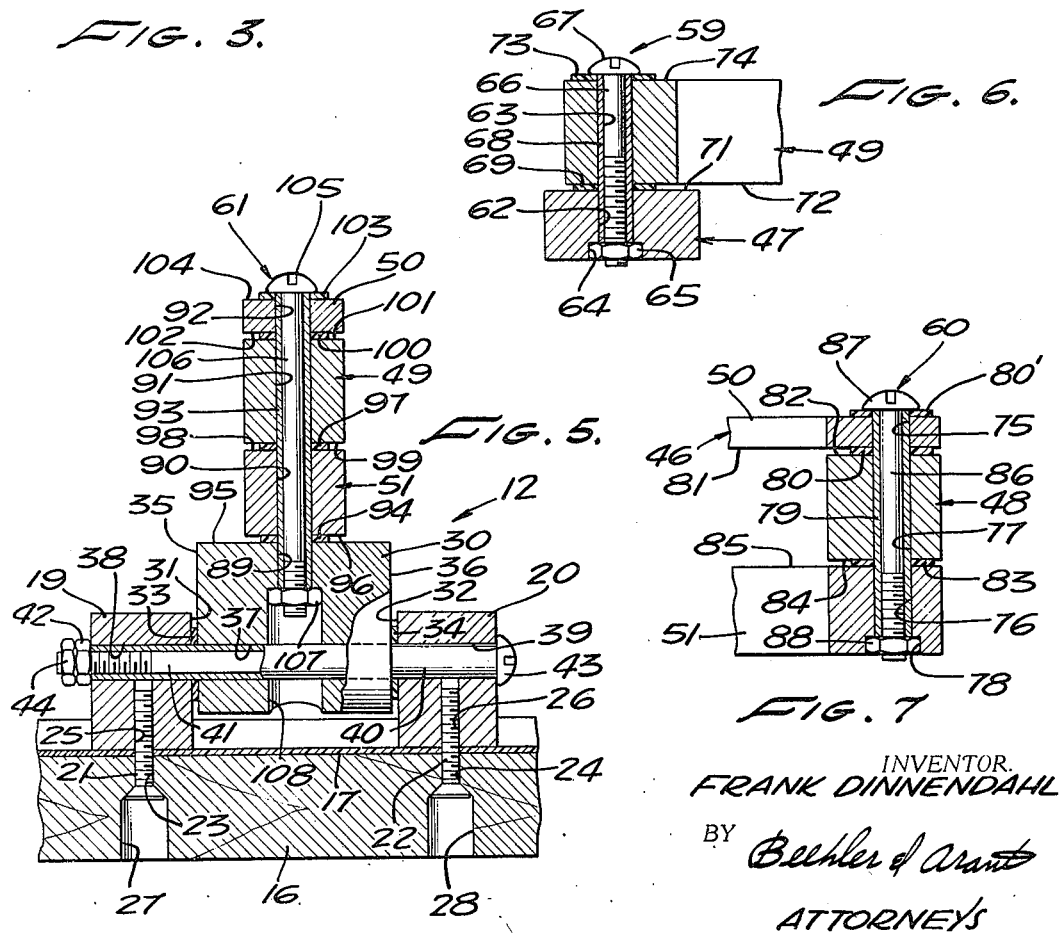
INVENTOR.
FRANK DINNENDAHL
BY Bechler & Arant
ATTORNEYS

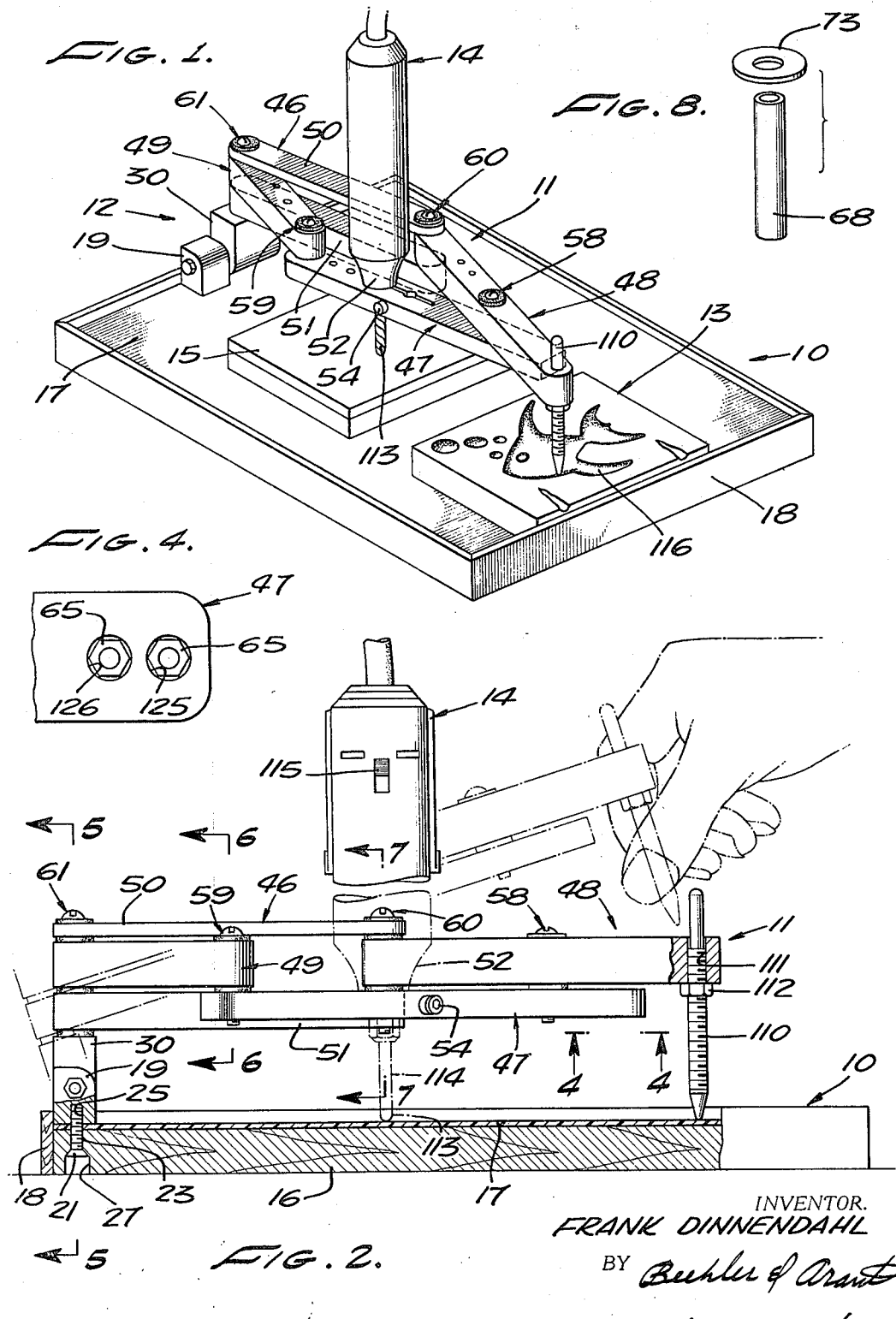

United States Patent Office 3,496,795
Patented Feb. 24, 1970

3,496,795
PANTOGRAPH
Frank Dinnendahl, 3544 Foothill Blvd.,
La Crescenta, Calif. 91014
Filed Aug. 8, 1968, Ser. No. 751,269
Int. Cl. G05g 1/00; B43l 13/10; B25q 3/38
U.S. Cl. 74—469   9 Claims

ABSTRACT OF THE DISCLOSURE

A pantograph machine made rugged and precise in its operation by long joints wherein the pivot bore is lined with a low friction metallic sleeve and low friction plastic washers are held in position by a bolt extending through the sleeve and used as a means for adjustably tightening the pivoting arms of the pantograph in position.

---

Pantograph machines have been in widespread use for innumerable years for the purpose of reproducing irregular outlines with a high degree of accuracy in such fashion that the outline reproduced can be either the same, greater than or smaller than the original pattern, depending upon the relative locations of the tracing stylus and the reproducing cutter. With the advent of power driven cutting devices and high performance cutting tools, pantographs have been capable of cutting material of much greater hardness and much greater toughness than has previously been feasible. There have, however, been limitations in commercially available pantograph machines which frequently, in being made heavy enough to withstand the demands of high performance cutting equipment, have been often too heavy for easy operation and frequently too fatiguing to use, thereby minimizing the advantages of power actuated devices. Pantograph devices possessed of conventional joints have either been insufficiently firm to make dependably accurate reproduction possible or the iojnts have been such as to suffer under the wear of continued use without the prospect of having them retightened in a way to restore the original precision performance.

It is therefore among the objects of the invention to provide a new and improved pantograph structure which is rugged and precise, which is relatively light in weight considering the demands placed upon it as a result of using power actuated cutters, but which is so jointed that it is possessed of easy manipulation without prospect of the joints wearing and loosing their accuracy and good performance characteristics.

Another object of the invention is to provide a new and improved pantograph structure possessed of a very simplified joint structure which is substantially friction-free, which can be readily adjusted to the most desirable degree of firmness, without sacrificing freedom of motion, and which is capable of retaining its high degree of precision once the initial assembly adjustment has been established.

Still another object of the invention is to provide a new and improved pantograph structure wherein not only are the joints of the pantograph parallelogram made especially firm and substantially friction-free, but wherein other joints have a built-in equal degree of precision and friction-free motion including the joint permitting the structure to be tilted up while work pieces are removed and replaced.

Still another object of the invention is to provide a new and improved pantograph structure assembly wherein the moving arms are particularly rugged though light in weight, wherein the arms are constructed relatively simple and of inexpensive materials, but wherein all movable joints have a high degree of firmness without sacrificing freedom of movement.

With these and other objects in view, the invention consists in the construction, arrangement, and combination of the various parts of the device, whereby the objects contemplated are attained, as hereinafter set forth, pointed out in the appended claims and illustrad in the accompanying drawings.

In the drawings:

FIGURE 1 is a top perspective view of the pantograph structural assembly showing the device in operation.

FIGURE 2 is a side elevational view partially broken away.

FIGURE 3 is a plan view partially broken away.

FIGURE 4 is a fragmentary bottom view taken on the line 4—4 of FIGURE 2.

FIGURE 5 is a cross-sectional view taken on the line 5—5 of FIGURE 2.

FIGURE 6 is a fragmentary cross-sectional view taken on the line 6—6 of FIGURE 2.

FIGURE 7 is a fragmentary cross-sectional view taken on the line 7—7 of FIGURE 2.

FIGURE 8 is an exploded view showing low friction elements of the joints.

In an embodiment of the invention chosen for the purpose of illustration there is shown a substantially conventional base indicated generally by the reference character 10 on which a pantograph structure 11 is mounted by means of a mounting assembly 12 in such fashion that when the pantograph structure 11 is employed to trace a pattern block 13 a power actuated tool 14 is capable of reproducing the design in a workpiece 15.

More particularly, the base 10 is shown as possessed of a base plate 16 over which is an accurate surface plate 17 surrounded by a flange 18 on all four sides of the rectangularly shaped base.

To support the pantograph structure in position, there are provided two laterally spaced stationary mounting blocks 19 and 20 located adjacent one end of the base 10, as shown in FIGURES 1, 2, and 3. The blocks are held in position by respective screws 21 and 22 which extend upwardly through holes 23 and 24 in the base plate 16, through the surface plate 17 and thence into threaded holes 25 and 26 of the respective mounting blocks 19 and 20. Counterbore holes 27 and 28 permit the screws to be countersunk clear of the lower surface of the base plate 16.

A movable mounting block 30 has a breadth slightly smaller than the distance between opposite faces 31 and 32 of the stationary mounting blocks 19 and 20, sufficient to accommodate a low friction washer 33 between the face 31 and opposite face 35 and on the other side, and a low friction washer 34 between the face 32 and opposite face 36.

To hold the movable mounting block 30 in position, there is provided a bore 37 through the movable mounting block 30 and bores 38 and 39, respectively, through the stationary mounting blocks 19 and 20. Extending through all three bores 37, 38, and 39 is a sleeve 40 of a material such as stainless steel on those occasions where the blocks are of aluminum, the sleeve 40 having a length slightly in excess of the aggregate length of the three bores 37, 38, and 39 and the thickness of the washers 33 and 34. A bolt 41 extends through the sleeve 40 and a nut 42 drawing against a head 43 serves to tighten the three blocks in assembled position with the faces heretofore mentioned bearing against respective faces of the low friction washers. A locknut 44 is provided to hold the adjustment once it has been properly made. In a construction of the type made reference to, the connection formed by the bolt, the sleeve and the washers can be made relatively firm, while at the same time permitting a substantial freedom of movement of the movable mounting block 30.

Pantograph arm members 46, 47, 48, and 40 which, for example are of aluminum, are connected together in a typical parallellogram fashion as shown in FIGURES 1 and 5, and make up a substantial portion of the pantograph structure 11, one corner of which is mounted upon the movable mounting block 30. In the chosen embodiment the arm member 46 is constructed of two parallel arm elements 50 and 51 as is more readily observable in FIGURES 1 and 2. The arm member 47 for practical purposes is made slightly wider so as to accommodate the power actuated tool 14, a lower end 52 of which fits in an aperture 53 where it can be tightened in place by a screw 54 drawing against parts 55 and 56 separated by a split 57.

Joints 58 and 59 are substantially the same and are illustrated by way of example in FIGURE 6. The joint 60 is illustrated in FIGURE 7 and the joint 61 in FIGURE 5.

For making the joint 59 there is formed a bore 62 in the arm member 47 and an axially aligned bore 63 in the arm member 49. A counterbore recess 64 accommodates a nut 65 of the bolt 66 which has a head 67 on the opposite end. A sleeve 68 extends through the two bores 62 and 63 and has a length slightly in excess of the aggregate length of the two bores, but slightly less than the aggregate length of the bores plus the thickness of washers 69 and 73. The washer 69 of low friction material occupies a position between opposite faces 71 and 72 of the respective arm member 47 and 49. The washer 73, also of low friction material, is located between the head 67 and the bolt 66, and an upper face 74 of the arm member 49. The sleeve 68 and the walls of bores 62 and 63 are of dissimilar metals to minimize frictional drag and prevent wearing of the metal surfaces which are in engagement. Formed as described with relatively long bores 62 and 63, the sleeve extending continuously through both bores and a comparably long bolt 66, there is provided a particularly firm, precise joint which can be snugly drawn into position by nut and bolt action, but which nevertheless remains relatively friction-free in its articulation. Also by having the sleeve length slightly less than the aggregate length of the bores 62 and 63 plus the combined thickness of the washers 69 and 73, but longer than the aggregate length of the bores, a fixed amount of deformation of the low friction washers is established which assures a snug articulating joint as well as adequate freedom of movement. Although aluminum and stainless steel have been proposed in a selected relationship, it is understood that other dissimilar materials of comparable physical and structural characteristics may be employed.

Similarly, the joint 60 serves to interconnect upper end lower arm elements 50, 51 of the arm member 46 with the arm member 48, as shown in FIGURE 7. To accomplish this, axially aligned bores 75 and 76 in the respective arm elements 50 and 51 are drilled in alignment with a bore 77 in the arm member 48. A counterbore recess 78 is provided in the lower side of the arm element 51 in communication with the bore 76. A sleeve 79 of similar stainless steel material slightly longer than the aggregate length of all three bores 75, 76, 77 extends through the three bores. A low friction washer 80 is positioned between opposite faces 81 and 82 of the arm element 50 and the joining arm member 48. Similarly, a washer 83 of low friction material is located between and separates opposite faces 84 and 85, respectively, of the arm member 48 and the arm element 51, and the washer thicknesses added to the length of the bores is slightly greater than the length of the sleeve. A bolt 86 extends through the sleeve 79 so that a head 87 at one end can be drawn against the washer 80' and arm element 50 by means of a nut 88 at the opposite end which is lodged in the counterbore recess 78. With the low friction combination, such as the sleeve 79 of dissimilar material and washers 80 and 83, positioned as shown and constructed of the material made reference to, there is made possible a very firm, precise joint which can be accurately adjusted and which will always remain substantially friction free.

The joint 61 is only slightly different, as illustrated in FIGURE 5, in that it is one which must attach the arm member 49 and arm elements 50 and 51 to the movable mounting block 30. To accomplish this, there is provided a bore 89 in the movable mounting block 30 which is in alignment with a bore 90 in the arm element 51, a bore 91 in the arm element 49, and a bore 92 in the arm element 50. A sleeve 93 of dissimilar material here again extends through all four bores 89, 90, 91 and 92 and has a length slightly in excess of the aggregate length of the four bores. A low friction washer 94 is located between a face 95 of the movable block 30 and a face 96 of the adjacent arm element 51. A washer 97 is located between a face 98 on the arm element 51 and a face 99 on the arm member 49. A washer 100 is located between a face 101 on the arm member 49 and a face 102 on the arm element 50, and a washer 103 is located between a face 104 on the arm element 50 and a head 105 of a bolt 106. All of the parts just described are drawn snugly into engagement by means of a nut 107 located in a counterbore recess 108 of the movable mounting block 30 when the bolt 106 is threaded into engagement with it. Here again a careful snug adjustment can be made without impeding free articulation of the parts which are so joined.

In use a stylus 110 threadably mounted in a threaded hole 111 in the arm member 48 is locked in adjusted position by means of a locknut 112. The protrusion of the stylus 110 is adjusted to accommodate a cutting edge 113 on a shaft 114 extending from the power actuated tool 14. When the cutting operation is to begin, the stylus is lifted up to a position suggested by the broken lines in FIGURE 2 and the power actuated tool may be energized by turning a switch 115. The stylus 110 is then lowered into position upon a pattern 116 of the pattern block 13 and the stylus is traced through the pattern. At the same time the cutting edge 113 cuts a pattern of comparable proportion in the work piece 15. The proportions naturally can be changed by using different holes or bores in the arm members, as for example the bores 117, 118 in the arm member 49, the bores 119, 120 in the arm member 46, the bores 121 and 122 in the arm member 48, and the bores 123 and 124 in the arm member 47. These bores are made of the same diameter as the other bores heretofore described in the arm members so that the same type of joints can be made up in each instance. If preferred, nuts like the nut 65 may be lodged in counterbore recesses 125, 126, for example, as suggested in FIGURE 4, so that only the bolt in each instance may need to be withdrawn and placed in a new set of axially aligned bores when such an adjustment is to be made.

While the invention has herein been shown and described in what is conceived to be a practical and effective emobdiment, it is recognized that departures may be made therefrom within the scope of the invention.

Having described the invention, what is claimed as new in support of Letters Patent is:

1. In a pantograph structure having a base, a mounting assembly and a pantograph frame comprising two pairs of arm members pivotally joined to each other in pantograph form and attached to said mounting assembly, the combination of a joint means for pivotally joining said arm members comprising axially aligned bores in adjacent ends of adjoining arm members, a sleeve of dissimilar material extending through said bores and with the exterior of the sleeve in substantial engagement with the interior of said bores, a washer of low friction material between opposite faces of said adjacent ends, and a fastener comprising a shaft of rigid material extending through and beyond opposite ends of the sleeve and substantially filling the interior of said sleeve, said shaft having opposite ends overlying respective ends of the sleeve and surrounding surfaces of the respective arms, and means drawings said opposite ends of the shaft in snug though moving engagement with the sleeve and said adjacent ends of adjoining arms.

2. In a pantograph structure according to claim 1 wherein the sleeve has a length less than the combined length of the bores and less than the aggregate of the combined length of the bores plus the washer thickness.

3. In a pantograph structure as in claim 2 wherein the bores of said arm members are of metal of one kind and said sleeve is of metal dissimilar with respect to the metal of the bores.

4. In a pantograph structure as in claim 3 wherein the bores are of aluminum and the sleeve is of stainless steel.

5. In a pantograph structure as in claim 1 wherein one of said arm members adjoining said mounting assembly is a two part arm with upper and lower parallel parts respectively overlying and underlying adjoining arms.

6. In a pantograph structure as in claim 5 wherein there are washers of low friction material between all opposite faces of said arms.

7. In a pantograph structure as in claim 1 wherein said fastener comprises a bolt having a nut therefor inset in one of said arms and a head therefor at the other end.

8. In a pantograph structure as in claim 1 wherein said mounting assembly comprises laterally spaced stationary blocks on the base, a movable block between said stationary blocks, axially aligned bores respectively in said stationary and movable blocks, a sleeve of material dissimilar from the material of the bores extending through said bores, washers of low friction material between adjacent faces of said blocks and a fastening means comprising a rigid shaft extending through said sleeve and opposite ends on said shaft drawn toward each other whereby the movable block is in snug though moving engagement with the stationary blocks.

9. In a pantograph structure as in claim 8 wherein there is a second bore in said moving block in a direction at right angles to the first identified bore, adjacent ends of arms adjoining said moving block having bores therein in axial alignment with said second bore, washers of low friction material between opposite faces of said last identified adjacent ends, a sleeve of low friction material extending through the bores in axial alignment and having a length slightly in excess of the combined length of all said bores last mentioned, and anchoring means comprising a rigid anchor shaft extending through said last mentioned sleeve with opposite ends on said anchor shaft drawn toward each other whereby the parts through which all said bores last mentioned extend are in snug though moving engagement.

References Cited

UNITED STATES PATENTS

| 2,881,521 | 4/1959 | Pearson | 33—25 |
| 3,218,098 | 11/1965 | Rowlett | 287—100 |
| 3,327,552 | 6/1967 | Broders et al. | 74—469 |

MILTON KAUFMAN, Primary Examiner

U.S. Cl. X.R.

33—25; 287—100